United States Patent
Oh et al.

(10) Patent No.: US 7,979,392 B2
(45) Date of Patent: Jul. 12, 2011

(54) METHOD AND APPARATUS FOR PREVENTING DUPLICATE SAVING OF RESOURCE BETWEEN UNIVERSAL PLUG AND PLAY DEVICES PROVIDING CONTENT DIRECTORY SERVICE

(75) Inventors: Seung-jae Oh, Seoul (KR); Joo-yeol Lee, Seoul (KR); Dong-shin Jung, Suwon-si (KR); Se-hee Han, Seoul (KR); Won-seok Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 11/727,690

(22) Filed: Mar. 28, 2007

(65) Prior Publication Data

US 2008/0104249 A1    May 1, 2008

(30) Foreign Application Priority Data

Oct. 31, 2006    (KR) .................. 10-2006-0106705

(51) Int. Cl.
*G06F 17/30*    (2006.01)
(52) U.S. Cl. ......... 707/621; 707/625; 709/248; 709/217
(58) Field of Classification Search .................. 707/10, 707/200–204; 709/203, 217
See application file for complete search history.

(56) References Cited

U.S. PATENT DOCUMENTS

| | | | |
|---|---|---|---|
| 7,010,657 B2 | 3/2006 | Lowe et al. | |
| 7,325,057 B2* | 1/2008 | Cho et al. | 709/224 |
| 7,640,329 B2* | 12/2009 | Rao et al. | 709/223 |
| 2004/0221007 A1* | 11/2004 | Roe et al. | 709/203 |
| 2004/0249972 A1* | 12/2004 | White et al. | 709/243 |
| 2005/0135341 A1 | 6/2005 | Kim | |
| 2005/0138192 A1* | 6/2005 | Encarnacion et al. | 709/230 |
| 2006/0085383 A1* | 4/2006 | Mantle et al. | 707/1 |
| 2006/0155980 A1* | 7/2006 | Bodlaender | 713/100 |
| 2007/0226312 A1* | 9/2007 | Stirbu et al. | 709/217 |
| 2009/0164667 A1* | 6/2009 | Zhang et al. | 709/248 |

FOREIGN PATENT DOCUMENTS

| | | |
|---|---|---|
| JP | 2006-4277 A | 1/2006 |
| KR | 1020060094107 A | 8/2006 |
| WO | 2005/076914 A2 | 8/2005 |

OTHER PUBLICATIONS

Communication issued in counterpart Japanese Application No. 2009-534480 dated Apr. 26, 2011.

* cited by examiner

*Primary Examiner* — Debbie Le
(74) *Attorney, Agent, or Firm* — Sughrue Mion, PLLC

(57) ABSTRACT

A method and apparatus for preventing duplicate saving of a resource between universal plug and play (UPnP) devices, which provide content directory service during content synchronization, are provided. The method includes receiving a change log including metadata about a changed resource from a UPnP device of a transmitter, determining whether the changed resource is a duplicate based on the received change log, and receiving and saving the changed resource according to a designated saving path based on a result of the determination.

24 Claims, 6 Drawing Sheets

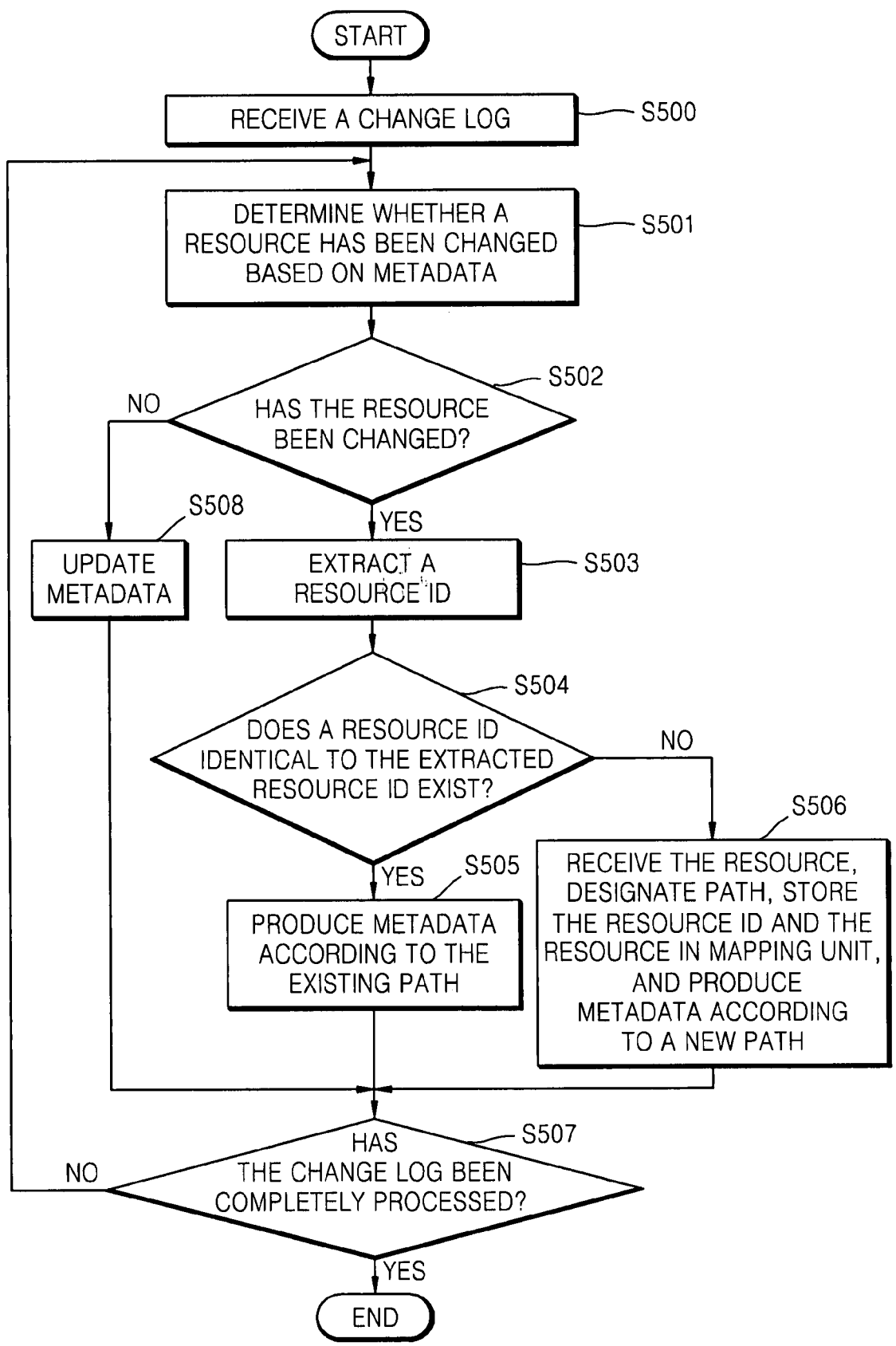

METHOD AND APPARATUS FOR PREVENTING DUPLICATE SAVING OF RESOURCE BETWEEN UNIVERSAL PLUG AND PLAY DEVICES PROVIDING CONTENT DIRECTORY SERVICE

CROSS-REFERENCE TO RELATED PATENT APPLICATIONS

This application claims priority from Korean Patent Application No. 10-2006-0106705, filed on Oct. 31, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to a home network, and more particularly, to preventing duplicate saving of a resource between universal plug and play (UPnP) devices that provide content directory service during content synchronization.

2. Description of the Related Art

Universal plug and play (UPnP) technology enables communication between devices that are connected in a network without a complex setup procedure, so that a service provided by a device can be automatically searched by the other devices. Therefore, when a user only connects to a device in a UPnP network, the user may easily use the service that is provided by a random device connected to the network.

FIG. 1 is a conceptual diagram illustrating a method of synchronizing content between UPnP devices that provide content directory service.

Referring to FIG. 1, the user selects devices, which are to be subjected to synchronization, using a control point 100, and the selected devices transmit resources of the selected devices to each other using content directory services 101 and 102 of the selected devices respectively, whereby the content synchronization is performed.

Information provided by the content directory services 101 and 102 of the selected devices is metadata about an item. The metadata includes a saving path for a resource. For example, assuming that the resource is an MPEG-1 Audio Layer 3 (MP3), which is a music file that is often played by the user and is also included in a music file list and a musician list, and the saving paths of the MP 3 resource included in the music file list and the musician list are the same. In such case, according to related content synchronization technology, a receiver providing the content directory service receives both of the MP 3 resources that are saved in the saving path included in the music file list and in the saving path included in the musician file list, respectively, and the received resources are saved in respective new paths. Therefore, the problem is that a single resource managed in a device of a transmitter is repeatedly saved in a device of a receiver.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for preventing a resource from being saved repeatedly by considering at least one of a resource identification and a saving path when content is synchronized between devices that provide content directory service.

According to an aspect of the present invention, there is provided a method of preventing duplicate saving of a resource during content synchronization between a universal plug and play (UPnP) device of a transmitter and a UPnP device of a receiver, which provide content directory service, the method comprising receiving a change log including metadata about a changed resource from the UPnP device of the transmitter, determining whether the changed resource is a duplicate based on the received change log and designating a saving path according to a result of the determination, and receiving the changed resource in the UPnP device of the receiver and saving the changed resource according to the designated saving path. The saving path is provided by one of the UPnP device of the transmitter and the UPnP device of the receiver.

According to another aspect of the present invention, there is provided a computer readable recording medium for recording a program for executing the above-described method.

According to another aspect of the present invention, there is provided an apparatus for preventing duplicate saving of a resource during content synchronization between a UPnP device of a transmitter and a UPnP device of a receiver, which provide content directory service, the apparatus comprising a change log or resource receiving unit receiving a changed resource and a change log, which includes metadata about the changed resource, from the UPnP device of the transmitter; a resource identification and path mapping unit storing a resource identification of resource stored in the receiver and a saving path corresponding to the resource identification; and a resource managing unit determining whether the changed resource is a duplicate based on the received change log, designating a saving path according to a result of the determination, and saving the changed resource according to the designated saving path. The saving path is provided by one of the UPnP device of the transmitter and the UPnP device of the receiver.

According to still another aspect of the present invention, there is provided a method of preventing duplicate saving of a resource during content synchronization between a UPnP device of a transmitter and a UPnP device of a receiver, which provide content directory service, the method comprising detecting a change of the resource in the UPnP device of the transmitter, producing a change log including metadata about the changed resource, and transmitting the change log to the UPnP device of the receiver through a UPnP network. The change log comprises a unique resource identification of the changed resource and information about whether a saving path of the changed resource has been changed.

According to yet another aspect of the present invention, there is provided a computer readable recording medium for recording a program for executing the above-described method.

According to a further aspect of the present invention, there is provided an apparatus for preventing duplicate saving of a resource during content synchronization between a UPnP device of a transmitter and a UPnP device of a receiver, which provide content directory service, the apparatus comprising a resource change monitoring unit detecting a change of the resource, a change log producing unit producing a change log including metadata about the changed resource, and a change log or resource transmitting unit transmitting the changed resource and the change log to the UPnP device of the receiver through a UPnP network. The change log comprises a unique resource identification of the changed resource and information about whether a saving path of the changed resource has been changed.

BRIEF DESCRIPTION OF THE DRAWINGS

The above and other aspects of the present invention will become more apparent by describing in detail exemplary embodiments thereof with reference to the attached drawings in which:

FIG. 5 is a flowchart illustrating a method in which a UPnP device of a receiver, which provides content directory service, prevents duplicate saving of a resource during content synchronization, according to an exemplary embodiment of the present invention.

DETAILED DESCRIPTION OF THE INVENTION

Figure 1:
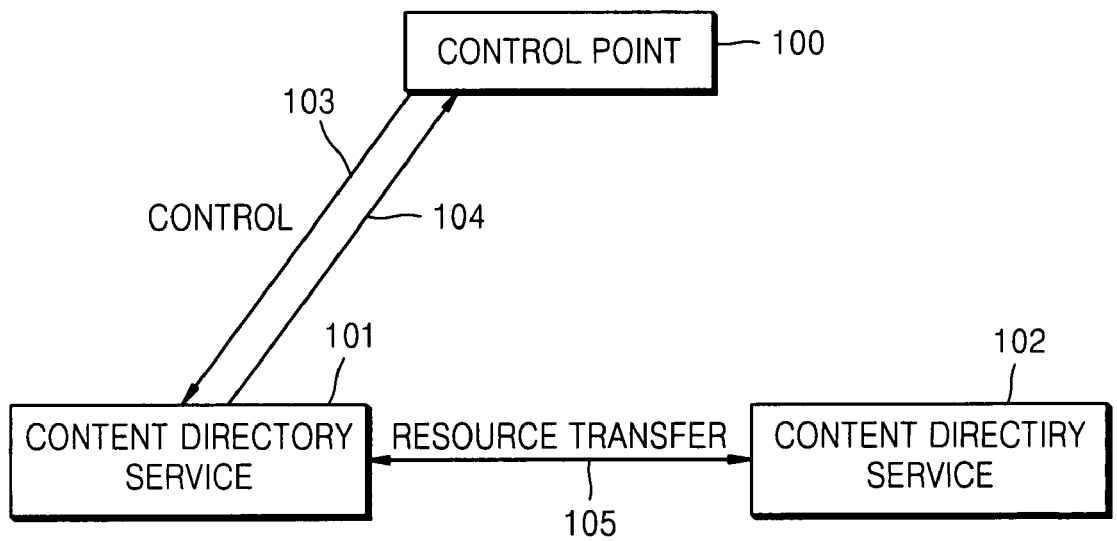
FIG. 1 is a conceptual diagram illustrating a method of synchronizing content between universal plug and play (UPnP) devices that provide content directory service.

Hereinafter, the exemplary embodiments of present invention will be described in detail with reference to attached drawings. In the drawings, like reference numerals denote like elements. Also, in description below, many specific particulars such as a circuit board of the specific circuit are illustrated, but these specific particulars are provided only for general understanding of the ideas of the present invention, and one skilled in the art would be sure that the present invention can be exemplarily embodied without those specific particulars. And, if it is considered that the specific description of the related and noticed functions or structures may obscure the gist of the present invention, the specific description will be omitted.

Figure 2:
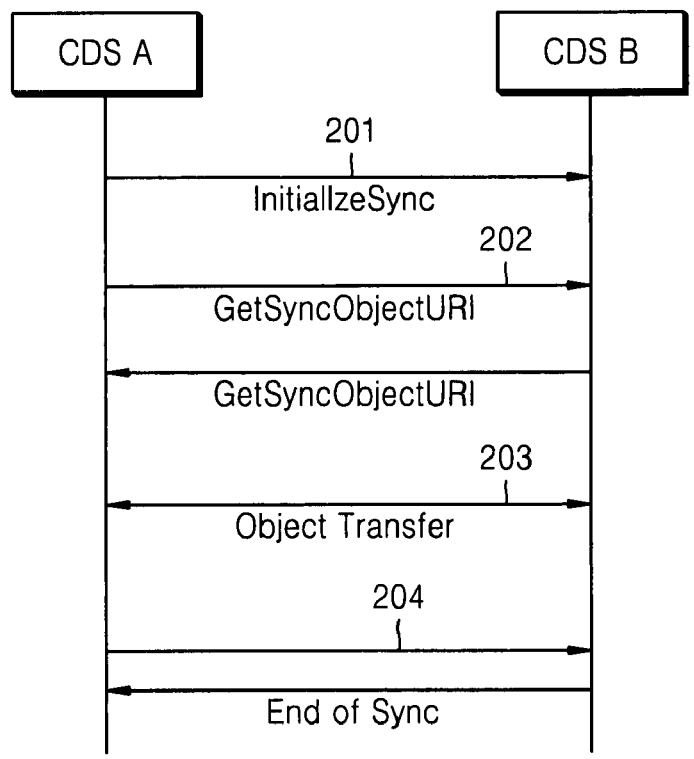
FIG. 2 is a flowchart illustrating a method of preventing duplicate saving of a changed resource when content is synchronized between UPnP devices that provide content directory service, according to an exemplary embodiment of the present invention.

FIG. 2 is a flowchart illustrating a method of preventing duplicate saving of a changed resource when content is synchronized between universal plug and play (UPnP) devices that provide content directory service, according to an exemplary embodiment of the present invention. In the present exemplary embodiment, it is assumed that two UPnP devices exist. In addition, the terminology, content directory service (CDS) is used as a module that provides CDS or as a service that is provided by a UPnP device.

Referring to FIG. 2, after initialization is performed in operation 201, CDSA and CDSB exchange change logs of the CDSA and CDSB, each of which includes metadata about changed items, in operation 202. That is, the change log exchange is performed by a UPnP action such as GetSyncObjectURI. The change log includes CDS item information in digital item declaration language (DIDL-Lite) form, and the CDS item information is comprised of attribute information of each CDS item and a saving path of a resource.

According to an exemplary embodiment of the present invention, in order to prevent duplicate saving of the resource, the change log additionally includes a unique resource identification (ID) and information about whether the saving path of the resource has been changed. The resource ID can be made using a hash function, for example, by adding up the first 10 bytes of the resource file, the last 10 bytes of the resource file, and 2 bytes indicating the size of the resource file. Further, unique values of the resource ID may be made in various ways. The change or non-change of the resource saving path may be expressed as a Boolean value such as TRUE (indicating the change of the resource saving path) or FALSE (indicating the non-change of the resource saving path) or may be expressed by a value using the saving path.

Thereafter, in operation 203, each of the CDSA and CDSB receives and saves the changed resource based on the change log. According to exemplary embodiments of the present invention, in the operation of receiving and saving a resource, a device in a receiver determines whether an identical resource has already been saved. If it is determined that the identical resource is already saved, the device in the receiver does not save the received resource. Thereafter, each of the CDSA and CDSB updates the metadata according to the saving path of the resource. Then, synchronization is completed in operation 204.

Figure 3:
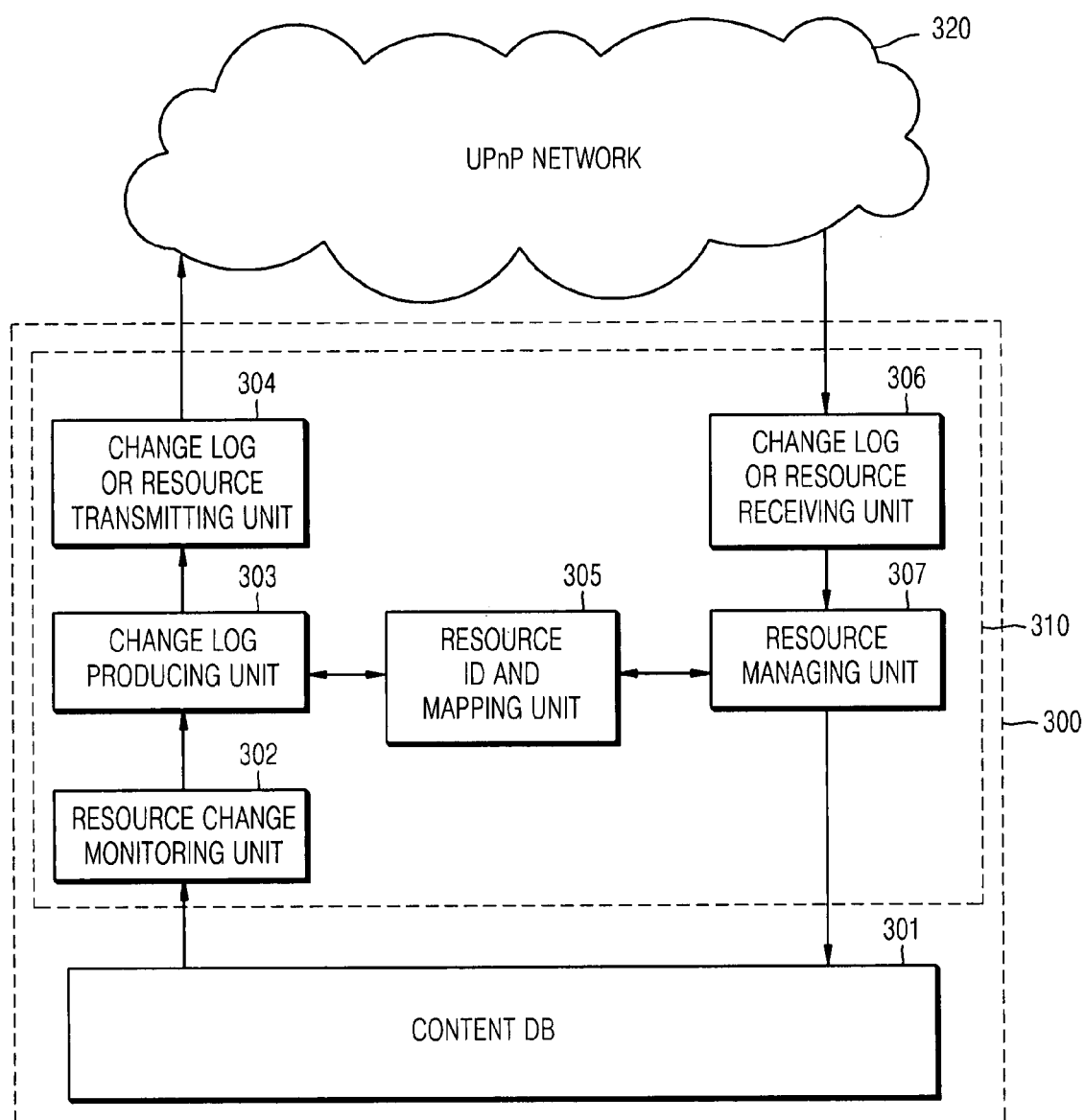
FIG. 3 illustrates the structure of a UPnP device according to an exemplary embodiment of present invention.

FIG. 3 illustrates the structure of a UPnP device 300 according to an exemplary embodiment of present invention. The UPnP device 300 comprises a CDS module 310 and a content database (DB) 301. The CDS module 310 comprises a resource change monitoring unit 302, a change log producing unit 303, a change log or resource transmitting unit 304, a resource ID and path mapping unit 305, a change log or resource receiving unit 306, and a resource managing unit 307. In an exemplary embodiment of the present invention, the meaning that the content is synchronized is that content lists provided by a plurality of CDSs agree with each other. However, the range of a synchronizing object, which is provided by one CDS, may be limited to a specific container according to exemplary embodiments of the present invention. For example, a user would be able to synchronize a certain folder in a home media center with a respective MP3 player of the user. The range of the synchronizing content would be different according to the ability of the device. For example, when audio content and video content are saved in a specific folder in the home media center and the user synchronizes the MP3 player with the specific folder, only audio content that the MP3 player can support is synchronized. In the current exemplary embodiment, it is assumed that content is synchronized.

The content DB 301 saves a resource and a content list, which are provided by the UPnP device 300 through the CDS. The content database 301 may be included within the UPnP device 300 or may be provided by an external server.

The resource change monitoring unit 302 monitors the content DB 301 and detects whether the resource has been changed. If it is detected that the resource has been changed, the resource change monitoring unit 302 informs the change log producing unit 303 of the change of the resource. The change of the resource may be at least one of an addition, a correction and a deletion of the resource and a change of a saving path of the resource.

When the resource has been changed, the change log producing unit 303 produces a change log including metadata about the changed resource and the change log or resource transmitting unit 304 transmits the produced change log including metadata about the changed resource to a UPnP network 320. The change log comprises a resource ID and information about whether the saving path of the resource has been changed. In addition, the change log producing unit 303 produces the resource ID and a saving path corresponding to the resource ID when the resource has been changed.

The resource ID and path mapping unit 305 stores the resource ID and the saving path corresponding to the resource ID, which are produced by the change log producing unit 303, in a table form.

The resource change monitoring unit 302, the change log producing unit 303, the change log or resource transmitting unit 304, and the resource ID and path mapping unit 305 are the elements for informing the UPnP network 320 with information about the change of the resource in the UPnP device 300. Contrarily, when a resource provided by a different content directory in the UPnP network 320 is changed, the resource ID and path mapping unit 305, the change log or resource receiving unit 306, and the resource managing unit 307 are elements for reflecting the changed information onto the CDS of the UPnP device 300.

The change log or resource receiving unit 306 receives a change log, which includes metadata about a changed resource, from a different UPnP device and transmits the change log to the resource managing unit 307. The resource managing unit 307 saves the changed resource in the content DB 301 according to path information based on information included in the change log.

In addition, the resource managing unit 307 produces metadata about the changed resource according to the path information and updates the resource ID and path mapping unit 305 with respect to the changed resource. The path information is provided by either a UPnP device in a transmitter or a UPnP device in a receiver.

Figure 4:
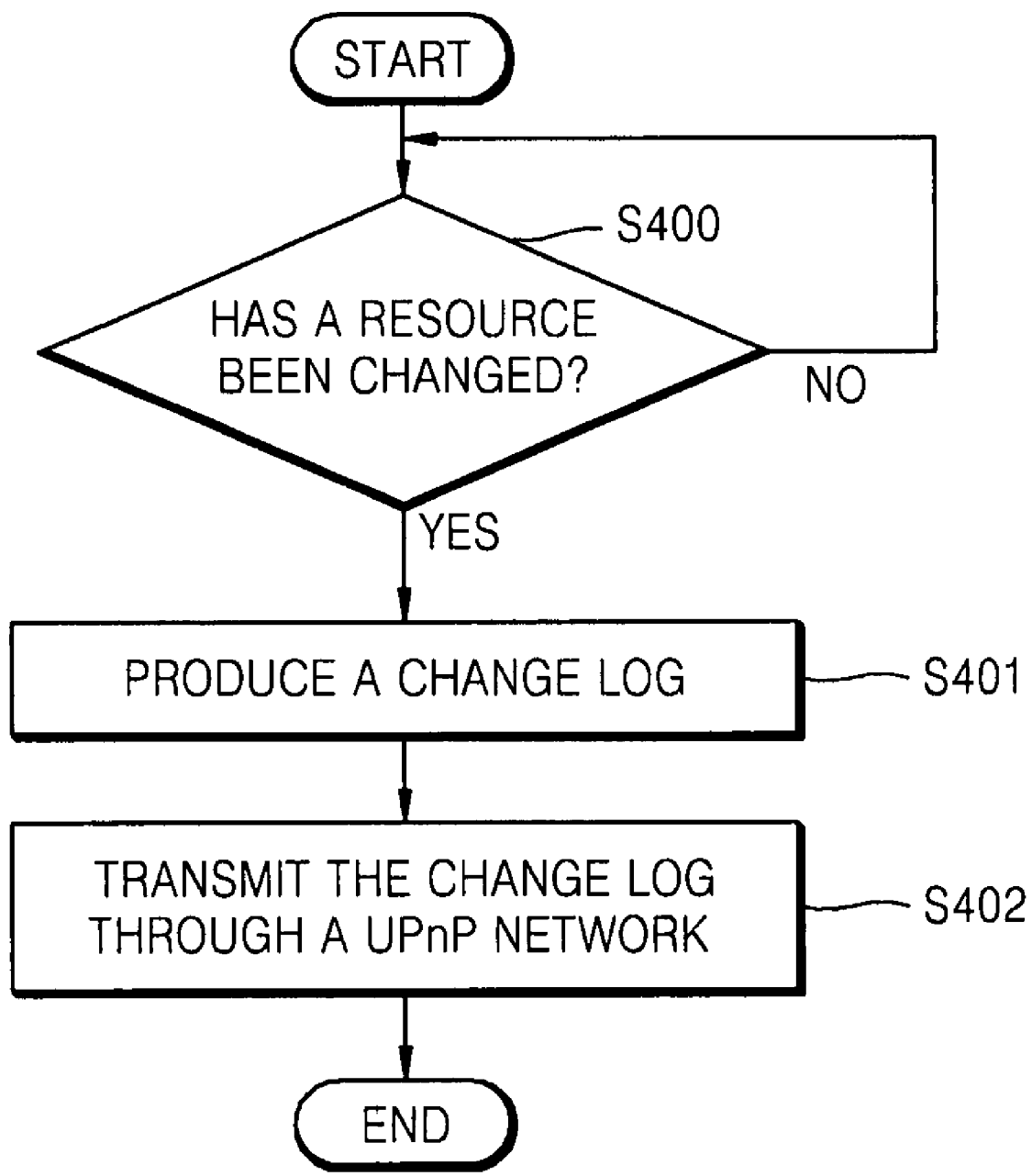
FIG. 4 is a flowchart illustrating a method in which a UPnP device of a transmitter, which provides content directory service, produces and transmits a change log about a changed resource, according to an exemplary embodiment of the present invention.

FIG. 4 is a flowchart illustrating a method in which a UPnP device of a transmitter, which provides CDS, produces and transmits a change log about a changed resource, according to an exemplary embodiment of the present invention.

Referring to FIG. 4, if it is determined that a resource has been changed in operation S400, a change log including metadata about the changed resource is produced in operation S401. The produced change log is transmitted to a UPnP device of a receiver through a UPnP network in operation S402. The change log may comprise a unique resource ID and information about whether the saving path of the resource has been changed. The change of the resource may be at least one of an addition, a correction and a deletion of the resource and the change of the saving path of the resource.

FIG. 5 is a flowchart illustrating a method in which a UPnP device of a receiver, which provides CDS, prevents duplicate saving of a resource during content synchronization only with a resource ID, according to an exemplary embodiment of the present invention.

Referring to FIG. 5, when a change log is received in operation S500, it is determined whether a resource has been changed based on information about change or non-change of a saving path, which is included in the change log, in operation S501.

If it is determined that the resource has been changed in operation S502, a resource ID is extracted from the received change log in operation S503.

If it is determined that a resource ID identical to the extracted resource ID exists in the resource ID and path mapping unit 305 in operation S504, metadata is produced according to an existing saving path stored in the resource ID and path mapping unit 305 included in the UPnP device of the receiver in operation S505.

If it is determined that the resource ID identical to the extracted resource ID does not exist in the resource ID and path mapping unit 305 in operation S504, the resource corresponding to the resource ID is received, the resource ID is produced, a saving path for the resource is designated, and metadata is produced according to the designated saving path for the resource in operation S506. The resource ID and the saving path corresponding to the resource are stored in the resource ID and path mapping unit 305.

If it is determined that the resource has not been changed in operation S502, content other than the resource, such as a title, a play time, and a play count (indicating the number of times the resource has been played) which are included in metadata, has been changed. In operation S508, the metadata is updated to reflect the change of the content.

In operation 507, the above-described operations are repeated until all items included in the change log are completely processed.

Figure 6A:
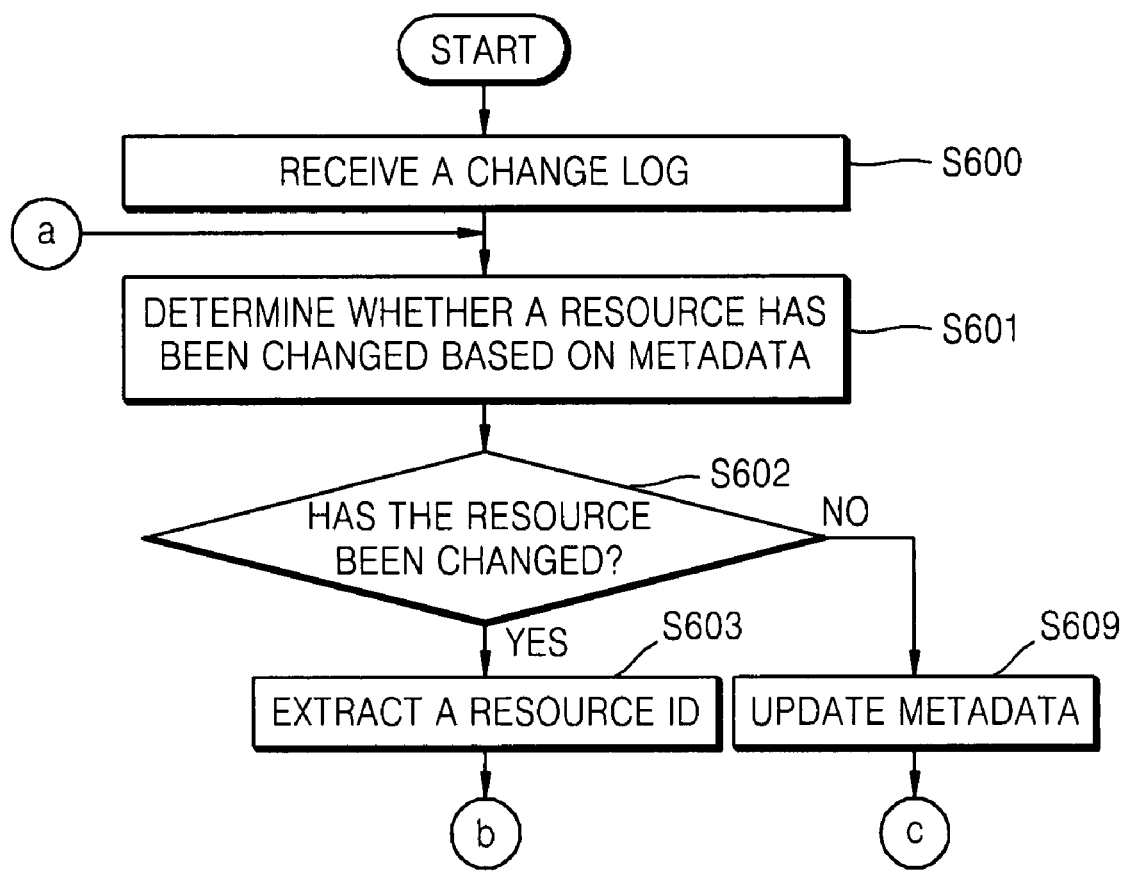
FIGS. 6A and 6B are flowcharts illustrating a method in which a UPnP device of a receiver, which provides content directory service, prevents duplicate saving of a resource during content synchronization, according to an exemplary embodiment of the present invention.
Figure 6B:
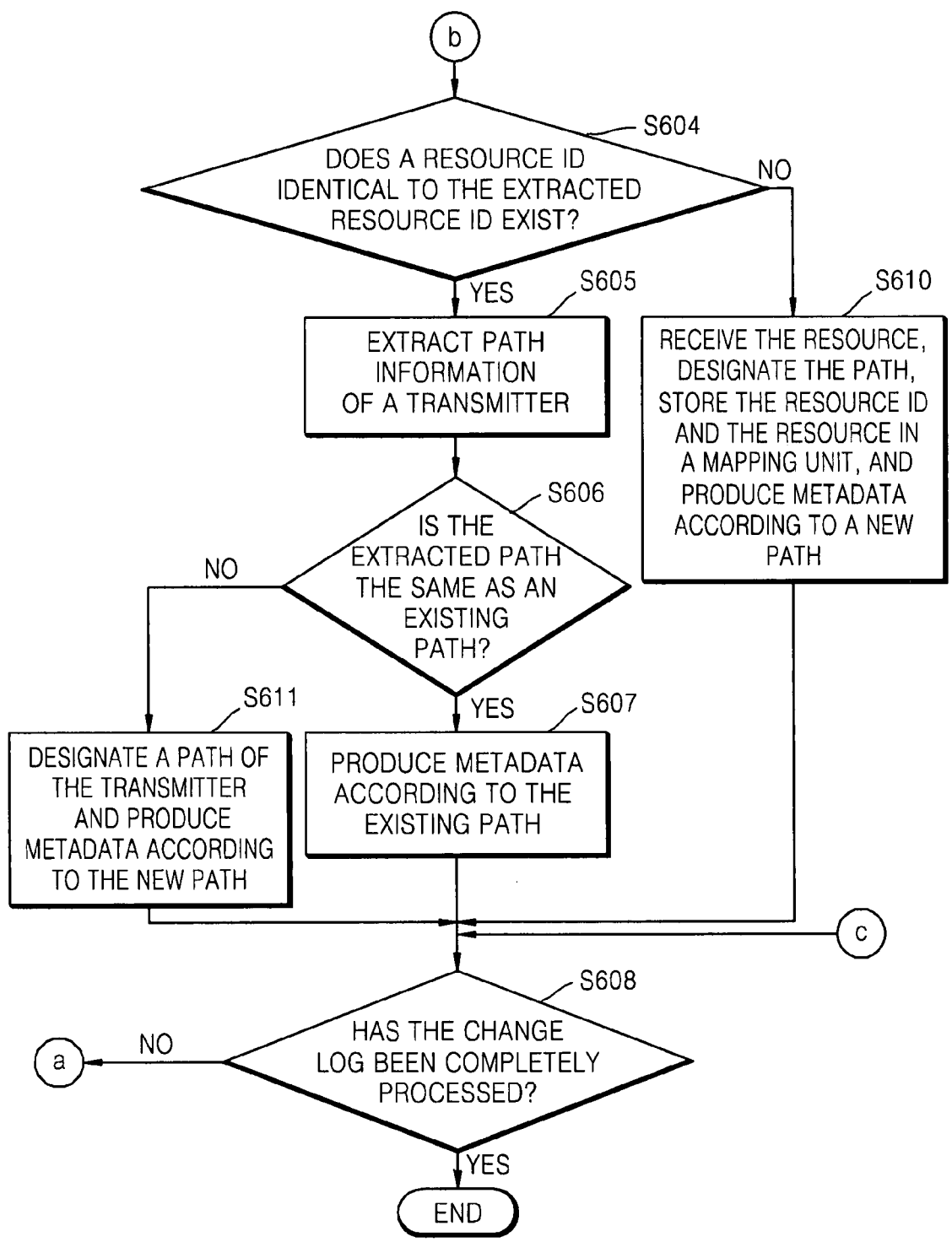

FIGS. 6A and 6B are flowcharts illustrating a method in which a UPnP device of a receiver, which provides CDS, prevents duplicate saving of a resource during content synchronization, according to another exemplary embodiment of the present invention. As described above, only the resource ID is considered in the method illustrated in FIG. 5. However, both a resource ID and a saving path are considered so as to prevent duplicate saving of the resource in the method illustrated in FIGS. 6A and 6B.

Referring to FIGS. 6A and 6B, when a change log is received in operation S600, it is determined whether a resource has been changed based on information about change or non-change of a saving path, which is included in the change log, in operation S601.

If it is determined that the resource has been changed in operation S602, a resource ID is extracted from the received change log in operation S603.

If it is determined that a resource ID identical to the extracted resource ID exists in the resource ID and path mapping unit 305 in operation S604, path information of a transmitter is extracted from the received change log in operation S605.

If it is determined that the path information of the transmitter is the same as a saving path stored in the resource ID and path mapping unit 305 in operation S606, metadata is produced according to the existing saving path stored in the receiver in operation S607.

If it is determined that the path information of the transmitter is not the same as the saving path stored in the resource ID and path mapping unit 305 in operation S606, a saving path of the transmitter, which is included in the received change log, is designated and registered in the resource ID and path mapping unit 305 in operation S611.

If it is determined that a resource ID identical to the extracted resource ID exists in the resource ID and path mapping unit 305 in operation S604, a resource corresponding to the resource ID is received, the resource ID is produced, a saving path for the resource is designated, and metadata is produced according to the designated saving path for the resource in operation S610. The resource ID and the saving path corresponding to the resource are stored in the resource ID and path mapping unit 305.

If it is determined that the resource has not been changed in operation S602, content other than the resource, such as a title, a play time, and a play count which are included in metadata, has been changed. In operation S609, the metadata is updated to reflect the change of the content.

In operation 608, the above-described operations are repeated until all items included in the change log are completely processed.

As described above, according to exemplary embodiments of the present invention, a device included in a transmitter transmits a change log including a resource ID and information about change or non-change of a saving path of a changed resource, and a device included in a receiver saves the received resource, which is identical to one stored in the receiver, in a single saving path using the received change log, whereby the received resource is prevented from unnecessarily being saved as duplicates. Moreover, saving space in the device can be used more efficiently.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of preventing duplicate saving of a resource in a universal plug and play (UPnP) device of a receiver during content synchronization between a UPnP device of a transmitter and the UPnP device of the receiver, which provide content directory service, the method comprising:
   using a processor to perform:
   (a) receiving a change log including metadata about a changed resource from the UPnP device of the transmitter;
   (b) determining whether the changed resource is a duplicate of a resource saved in the UPnP device of the receiver based on the received change log and designating a saving path according to a result of the determination; and
   (c) receiving the changed resource in the UPnP device of the receiver and saving the changed resource according to the designated saving path;
   wherein the receiving the change log, the determining, and the receiving the changed resource prevents duplicate saving of the resource.

2. The method of claim 1, wherein the saving path is provided by one of the UPnP device of the transmitter and the UPnP device of the receiver.

3. The method of claim 1, further comprising producing metadata according to the saving path.

4. The method of claim 1, wherein the change log comprises a unique resource identification of the changed resource and information about whether the saving path of the changed resource has been changed.

5. The method of claim 4, wherein operation (b) comprises:
   (b1) determining whether a resource identical to the changed resource exists in the UPnP device of the receiver using the unique resource identification; and
   (b2) if it is determined that the resource identical to the changed resource does not exist, designating a new saving path for the changed resource.

6. The method of claim 5, wherein operation (b2) further comprises, if it is determined that the resource identical to the changed resource does exist, designating a saving path, which has already been set in the UPnP device of the receiver, for the changed resource.

7. The method of claim 4, wherein operation (b) comprises:
   (b1) determining whether a resource identical to the changed resource exists in the UPnP device of the receiver using the resource identification and a saving path, which are included in the metadata of the received change log; and
   (b2) if it is determined that a resource that has the same as the resource identification and the saving path of receiver exists in the UPnP device of the receiver, designating the saving path, which has already been set in the UPnP device of the receiver, for the changed resource.

8. The method of claim 7, wherein operation (b2) further comprises, if it is determined that the resource identification is the same as resource identification of receiver but the saving path is different from that of receiver, designating a saving path, which has already been set in the UPnP device of the transmitter, for the changed resource.

9. The method of claim 7, wherein operation (b2) further comprises, if it is determined that the resource identification is different from the resource identification of receiver, designating a new saving path for the changed resource.

10. The method of claim 4, wherein the unique resource identification is produced using a hash function with respect to the changed resource.

11. The method of claim 1, wherein the changed resource is a result of any one from among an addition, a correction, and a deletion of a resource and a change of a saving path of the resource.

12. A computer readable recording medium having stored thereon instructions enabling a computer to perform a method of preventing duplicate saving of a resource in a universal plug and play (UPnP) device of a receiver during content synchronization between a UPnP device of a transmitter and the UPnP device of the receiver, which provide content directory service, the method comprising:
   (a) receiving a change log including metadata about a changed resource from the UPnP device of the transmitter;
   (b) determining whether the changed resource is a duplicate of a resource saved in the UPnP device of the receiver based on the received change log and designating a saving path according to a result of the determination; and
   (c) receiving the changed resource in the UPnP device of the receiver and saving the changed resource according to the designated saving path,
   wherein the receiving the change log, the determining, and the receiving the changed resource prevents duplicate saving of the resource.

13. An apparatus for preventing duplicate saving of a resource in a receiver during content synchronization between a universal plug and play (UPnP) device of a transmitter and a UPnP device of the receiver, which provide content directory service, the apparatus comprising:
   a processor which comprises:
   a change log or resource receiving unit which receives a changed resource and a change log, which comprises metadata about the changed resource, from the UPnP device of the transmitter;
   a resource identification and path mapping unit which stores a resource identification of a resource stored in the receiver and a saving path corresponding to the resource identification; and
   a resource managing unit which determines whether the changed resource is a duplicate of the resource stored in the receiver based on the received change log, designates a saving path according to a result of the determination, and saves the changed resource according to the designated saving path, and wherein the change log or resource receiving unit, the resource identification and path mapping unit, and the resource managing unit prevents duplicate saving of the resource.

14. The apparatus of claim 13, wherein the saving path is provided by one of the UPnP device of the transmitter and the UPnP device of the receiver.

15. The apparatus of claim 13, wherein the resource managing unit produces metadata according to the saving path of the changed resource.

16. The apparatus of claim 13, wherein the change log comprises a unique resource identification of the changed resource and information about whether a saving path of the changed resource has been changed.

17. The apparatus of claim 16, wherein the resource managing unit determines whether a resource identical to the changed resource exists in the UPnP device of the receiver using the unique resource identification and, if it is determined that the resource identical to the changed resource does not exist, designates a new saving path for the changed resource.

18. The apparatus of claim 17, wherein, if it is determined that the resource identical to the changed resource exists, the resource managing unit designates the saving path, which has already been set in the UPnP device of the receiver, for the changed resource.

19. The apparatus of claim 17, wherein the resource managing unit determines whether a resource identical to the changed resource exists in the UPnP device of the receiver using the resource identification and a saving path, which are included in the metadata of the received change log, and, if it is determined that a resource that has the same as the resource identification and the saving path of receiver exists in the UPnP device of the receiver, designates the saving path, which has already been set in the UPnP device of the receiver, for the changed resource.

20. The apparatus of claim 19, wherein, if it is determined that the resource identification is the same as resource identification of receiver but the saving path is different from that of receiver, the resource managing unit designates a saving path, which has already been set in the UPnP device of the transmitter, for the changed resource.

21. The apparatus of claim 19, wherein, if it is determined that the resource identification is different from the resource information of receiver, the resource managing unit designates a new saving path for the changed resource.

22. The apparatus of claim 13, wherein the resource identification is produced using a hash function with respect to the changed resource.

23. The apparatus of claim 13, wherein the changed resource is a result of any one from among an addition, a correction, and a deletion of a resource and a change of a saving path of the resource.

24. The apparatus of claim 13, further comprising a content database which stores the changed resource saved by the resource managing unit.

* * * * *